United States Patent
Ramakrishnan et al.

(10) Patent No.: US 8,893,131 B2
(45) Date of Patent: Nov. 18, 2014

(54) SYSTEM AND/OR METHOD FOR BULK LOADING OF RECORDS INTO AN ORDERED DISTRIBUTED DATABASE

(75) Inventors: Raghu Ramakrishnan, Los Altos, CA (US); Erik Vee, San Jose, CA (US); Ramana Yerneni, Cupertino, CA (US); Utkarsh Srivastava, Fremont, CA (US); Brian Frank Cooper, San Jose, CA (US); Adam Silberstein, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1604 days.

(21) Appl. No.: 12/101,443

(22) Filed: Apr. 11, 2008

(65) Prior Publication Data

US 2009/0260016 A1 Oct. 15, 2009

(51) Int. Cl.
G06F 9/46 (2006.01)
G06F 15/16 (2006.01)
G06F 7/00 (2006.01)
G06F 17/30 (2006.01)
G06F 9/50 (2006.01)

(52) U.S. Cl.
CPC ........ G06F 17/30339 (2013.01); G06F 9/5083 (2013.01); G06F 9/505 (2013.01)
USPC ............ 718/102; 718/105; 709/201; 707/812

(58) Field of Classification Search
CPC ................................................ G06F 17/30286
See application file for complete search history.

(56) References Cited

U.S. PATENT DOCUMENTS

| | | | |
|---|---|---|---|
| 6,154,746 A | 11/2000 | Berchtold et al. | |
| 6,223,182 B1 * | 4/2001 | Agarwal et al. | 1/1 |
| 6,243,715 B1 | 6/2001 | Bogantz et al. | |
| 7,003,508 B1 | 2/2006 | Shatdal | |
| 7,958,088 B2 | 6/2011 | Yerneni et al. | |
| 8,104,041 B2 * | 1/2012 | Belady et al. | 718/105 |
| 2002/0156738 A1 * | 10/2002 | Irmler | 705/52 |
| 2003/0191782 A1 | 10/2003 | Buxton et al. | |
| 2004/0267782 A1 * | 12/2004 | Nakano et al. | 707/100 |
| 2005/0187977 A1 * | 8/2005 | Frost | 707/104.1 |
| 2005/0235062 A1 * | 10/2005 | Lunt et al. | 709/225 |
| 2005/0278458 A1 | 12/2005 | Berger et al. | |
| 2006/0015588 A1 * | 1/2006 | Achlioptas et al. | 709/220 |
| 2006/0190497 A1 | 8/2006 | Inturi et al. | |
| 2006/0212495 A1 * | 9/2006 | Tokunaga et al. | 707/204 |
| 2006/0224773 A1 * | 10/2006 | Degenaro et al. | 709/240 |

(Continued)

OTHER PUBLICATIONS

Ganesan et al, "Online Balancing of Range-Partitioned Data with Applications to Peer-toPeer System,", 2004, Proceedings of the 30th VLDB Conference.*

(Continued)

*Primary Examiner* — Qing Wu
*Assistant Examiner* — Kevin X Lu
(74) *Attorney, Agent, or Firm* — Berkeley Law & Technology Group LLP (57) ABSTRACT

In a large-scale transaction such as the bulk loading of new records into an ordered, distributed database, a transaction limit such as an insert limit may be chosen, partitions on overfull storage servers may be designated to be moved to underfull storage servers, and the move assignments may be based, at least in part on the degree to which a storage server is underfull and the move and insertion costs of the partitions to be moved.

11 Claims, 5 Drawing Sheets

(56) References Cited

U.S. PATENT DOCUMENTS

| | | | |
|---|---|---|---|
| 2007/0220059 | A1 | 9/2007 | Lu et al. |
| 2008/0033927 | A1* | 2/2008 | Richards et al. ............... 707/4 |
| 2008/0097820 | A1* | 4/2008 | Koran et al. ................. 705/10 |
| 2008/0168082 | A1* | 7/2008 | Jin et al. ..................... 707/102 |
| 2009/0089313 | A1 | 4/2009 | Cooper et al. |
| 2009/0171885 | A1* | 7/2009 | Silberstein et al. ........... 707/2 |
| 2010/0217759 | A1* | 8/2010 | Ma et al. .................... 707/719 |
| 2011/0060885 | A1* | 3/2011 | Satoyama et al. ......... 711/170 |

OTHER PUBLICATIONS

Ram et al., "Database Allocation in a Distributed Environment: Incorporating a Concurrency Control Mechanism and Queuing Cost," Aug. 1994, Management Science, vol. 40, No. 8.*

Sun et al., "Dynamic Maintenance of Multidimensional Range Data Partitioning for Parallel Data Processing," 1998, DOLAP '98, pp. 72-79.*

Ganesan et al., "Online Balancing of Range-Partitioned Data with Application to Peer-to-Peer Systems", 2004, VLDB Conference, pp. 444-445.

U.S. Appl. No. 11/957,132, filed Dec. 14, 2007, 44 pages.

U.S. Appl. No. 11/957,132 Filing Receipt, mailed Jan. 11, 2008, 3 pages.

U.S. Appl. No. 11/957,132 Notice of Publication, mailed Jun. 18, 2009, 1 pages.

U.S. Appl. No. 11/957,132 Non-Final Office Action, mailed Sep. 15, 2010, 9 pages.

U.S. Appl. No. 11/957,132 Non-Final Office Action Response, mailed Dec. 14, 2010, 16 pages.

U.S. Appl. No. 11/957,132 Supplemental Response and Notice of Allowance and Fees Due, mailed Apr. 11, 2011, 17 pages.

U.S. Appl. No. 11/957,132 Issue Fee Payment and Post Allowance Communication, mailed Apr. 29, 2011, 3 pages.

U.S. Appl. No. 11/957,132 Issue Notification, mailed May 8, 2011, 1 page.

U.S. Appl. No. 11/965,714, filed Dec. 27, 2002, 42 pages.

U.S. Appl. No. 11/965,714 Filing Receipt, mailed Jan. 28, 2008, 3 pages.

U.S. Appl. No. 11/965,714 Notice to Applicant Regarding a Non-Compliant or Non-Responsive Amendment, mailed Aug. 15, 2008, 2 pages.

U.S. Appl. No. 11/965,714 Preliminary Amendment, mailed Sep. 9, 2008, 3 pages.

U.S. Appl. No. 11/965,714 Notice of Publication, mailed Jul. 2, 2009, 1 page.

U.S. Appl. No. 11/965,714 Non-Final Office Action, mailed Apr. 12, 2010, 25 pages.

U.S. Appl. No. 11/965,714 Non-Final Office Action Response, mailed Jul. 12, 2010, 17 pages.

U.S. Appl. No. 11/965,714 Final Office Action, mailed Aug. 27, 2010, 28 pages.

U.S. Appl. No. 11/965,714 Amendment Submitted with Filing CPA/RCA, mailed Oct. 27, 2010, 17 pages.

U.S. Appl. No. 11/965,714 Amendment After Final, mailed Nov. 12, 2010, 4 pages.

U.S. Appl. No. 11/965,714 Request for Continued Examination, mailed Nov. 29, 2010, 19 pages.

U.S. Appl. No. 11/965,714 Non-Final Office Action, mailed Jan. 10, 2011, 27 pages.

U.S. Appl. No. 11/965,714 Amendment Request After Non-Final Office Action, mailed Apr. 29, 2011, 24 pages.

U.S. Appl. No. 11/965,714 Final Office Action mailed Ju. 14, 2011, 27 pages.

"GridFTP." www.globus.org/grid_software/data/gridftp.php (1 page), Mar. 26, 2008.

"Hacmp for system p servers." www-03.ibm.com/systems/p/software/hacmp/index.html (2 pages), Mar. 26, 2008.

"Oracle real application clusters 11g." www.oracle.com/technology/products/database/clustering/index.html (2 pages), Mar. 26, 2008.

"Oracle Database 11 g Performance and Scalability." www.oracle.com/technology/deploy/performance/pdf/db_perfscale_11gr1_twp.pdf, Nov. 2007, (16 pages).

M.K. Aguilera, et al. "Sinfonia: A new paradigm for building scalable distributed systems." In Proc. SOSP, Oct. 2007 (16 pages).

P. Bernstein, et al. "Data management issues in supporting large-scale web services." Bulletin of the IEEE Computer Society Technical Committee on Data Engineering 2006 (7 pages).

L. Breslau, et al. "Web caching and zipf-like distributions: Evidence and implications." In Proc. IEEE INFOCOM, vol. XX, No. Y, Month 1999 (9 pages).

F. Chang et al. "Bigtable: A Distributed Storage System for Structured Data." In OSDI, 2006 (14 pages).

J. Dean, et al. "MapReduce: Simplified Data Processing on Large Clusters." In Proc. OSDI, Dec. 2004 (13 pages).

G. DeCandia, et al. "Dynamo: Amazon's highly Available Key-Value Store." In Proc. SOSP, Oct. 2007 (pp. 205-220).

D.J. DeWitt, et al. "Parallel Sorting on a Shared-Nothing Architecture Using Probabilistic Splitting." In Proc. Conference on Parallel and Distributed Information Systems (24 pages), 1991.

G. Graefe. "B-tree Indexes for High Update Rates." SIGMOD Record, vol. 35(1):39-44, Mar. 2006.

Community Systems Group. "Community Systems Research at Yahoo!" SIGMOD Record, vol. 36 (3):47-54, Sep. 2007.

H. Jagadish, et al. "Incremental Organization for Data Recording and Warehousing." In Proc. Very Large Databases, Aug. 1997; Proceedings of the 23rd VLDB Conference, Athens, Greece, 1997 (pp. 16-25).

S. Mishra. "Loading Bulk Data into a Partitioned Table." www.microsoft.com/technet/prodtechnol/sql/bestpractice/loading_bulk_data_partitioned_table.mspx, Sep. 2006 (7 pages).

C. Mohan, et al. "Algorithms for Creating Indexes for Very Large Tables without Quiescing Updates." In Proc. SIGMOD, Jun. 1992 (pp. 361-370).

P. O'Neil, et al. "The Log-Structured Merge-Tree." In Acta Informatica, vol. 33, 1996 (pp. 351-385) and book index (1 page); total 36 pages.

S. Seshadri, et al. "Sampling Issues in Parallel Database Systems." In Proc. Advances in Database Technology—EDBT '92 (3rd International Conference on Extending Database Technology, Vienna, Austria, Mar. 22-27, 1992 (22 pages).

J. Van Den Bercken, et al. "A Generic Approach to Bulk Loading Multidimensional Index Structures." In Proc. Very Large Databases, Aug. 1997; Proceedings of the 23rd VLDB Conference, Athens, Greece, 1997 (10 pages).

S. A. Weil, et al. Ceph: A Scalable, High-Performance Distributed File System. In Proc. OSDI, 2006 (14 pages).

J. Wiener, et al. "Oodb Bulk Loading Revisited: The Partitioned-List Approach." In Proc. Very Large Databases, Sep. 1995 (25 pages).

* cited by examiner

SYSTEM AND/OR METHOD FOR BULK LOADING OF RECORDS INTO AN ORDERED DISTRIBUTED DATABASE

BACKGROUND

1. Field

The subject matter disclosed herein relates to bulk loading of databases.

2. Information

The updating of large databases with large amounts of new information presents challenges. In particular, the records in a large database may be stored in a plurality of partitions with one or more partitions being handled by a server that may form part of a server system. Where a server stores multiple partitions, the partitions may or may not contain data in which the key ranges are sequential. For example, a server may store a first partition with one key range, and may also store a second partition with a different key range. The key range of such second partition might not start where the key range of the first partition leaves off, but rather may be a range that is much higher or much lower than the key range of the first partition.

Bulk loading of data into the database may be accomplished by inserting new data into the appropriate partition handled by the appropriate server. As a partition reaches its maximum desired size, the partition may be divided, or split, into two parts. After completion of the bulk loading process, the partitions may be balanced among the various servers of the server system, for example, so that the partitions are more evenly distributed across the servers on which they are stored.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Embodiments described herein relate to, among other things, bulk loading of records into a database, but the concepts may be applied to other bulk operations, such as bulk delete, simultaneous bulk insert into replicas and bulk indexing.

As discussed more fully below, a database may be stored on a plurality of storage servers that are in communication with one or more staging servers and a bulk load server.

In one embodiment, an ordered, distributed database may be stored in a plurality of partitions that may be, in turn, stored on a plurality of storage servers. Each partition may comprise one or more records in a particular key range. In massive databases being used or contemplated today, many partitions of a database may be stored on each storage server, and many storage servers may be used to store partitions. For example, 100, 200, 1000 or more storage servers may be employed, each storing a number of partitions.

In particular embodiments, such a storage server may comprise a processor with its own input/output bus, random access memory (RAM) and a storage unit such as, for example, a hard disk drive, RAID array drive, solid state memory or some other form of long-term storage. The storage servers of the server system may be linked by a wired and/or wireless local area network (LAN), fiber optic network, wide area network (WAN) or other network that links them together as part of the server system.

Large-scale data transaction may include such processes as bulk loading of new records into an ordered, distributed database, bulk removal of records from such a database, indexing involving large quantities of records and replication of databases. These may be approached in multiple stages.

For example, in one embodiment, and with reference to a bulk load process, a large quantity of new records may be presented for loading into an existing database. Each record may be associated with a unique key, and each partition may contain records with keys that fall into a unique key range. Bulk loading could simply proceed by taking each new record and adding it to the partition that has a key range that includes a key of a new record. This process could be continued until all new records have been inserted. Partitions that grow too large during this process may be divided (split) with some records remaining in the partition and others being moved to one or more new partitions.

Figure 1:
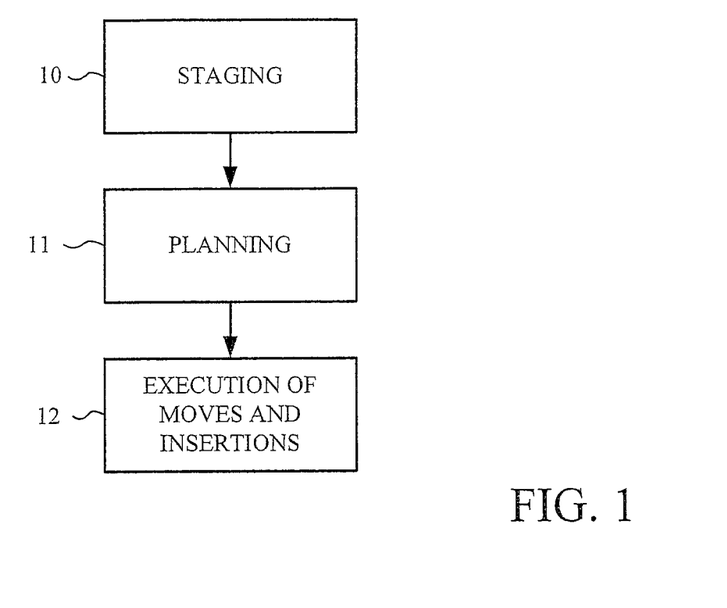
FIG. 1 is a flow diagram of a bulk load process.

However, in particular embodiments, other approaches to the task of bulk loading of new records into a database may be taken. Such approaches may be broken down into a series of stages. Referring to FIG. 1, a first stage 10 may involve receiving new records to be added to the database into a plurality of staging servers. These staging servers may be in communication over a network with storage servers on which partitions of the database are stored. Such staging servers may be in communication with a bulk load controller and the storage servers that store partitions making up the database. A bulk load controller may be a computing platform that may store information such as partition tables, and may operate to control bulk transactions such as bulk loading operations. The bulk load controller may be linked by network to staging servers and storage servers or may otherwise communicate with them via a communications port. Use of staging servers to temporarily store the new records may allow a system to take advantage of greater parallelism, for example, to speed the process of inserting new records into partitions of a database by distributing the insertion task across multiple staging servers.

Staging stage 10 may be followed by a planning stage 11. In this stage, planning of the bulk loading of new records into the database may be carried out. For example, planning stage 11 may include identification of partitions to be moved or transitioned among the storage servers. It will be appreciated that addition of large numbers of records to the existing partitions of a database may cause some or even most partitions to grow beyond a desired size. Thus, planning stage 11 may include the dividing of partitions containing a plurality of records (partition splits) and possible creation of new partitions to accommodate the new records that will later be inserted into them.

A partition splits may comprise division of one partition into two or more partitions, or may be more complex. For example, such partition splitting may involve combining portions of the data from two or more existing partitions in one or more new partitions. Partition splits do not need to involve moving of partitions from one server to another. Rather, partitions resulting from a partition split may be maintained on the same server on which the original partition resides.

In one embodiment, at this point in the planning stage 11, and as discussed more fully below in connection with FIG. 2, the planning stage 11 may further include selecting partitions to be moved from one storage server to another and planning for moving (transitioning) of partitions among servers. Such planning may allow the server system to manage and/or balance the costs of moving partitions and insertion of the new records into the partitions of the database.

Once planning stage 11 has been completed, the server system may continue to the stage 12 of moving partitions from one storage server to another and of insertion of new records into appropriate partitions. This may be accomplished in accordance with a plan or solution created during the planning stage. Of course, it may be desired to complete the actual moving of a partition from one storage server to another since inserting new records into a partition and then moving the partition incurs costs both for inserting the new records and then moving them to a new server along with other records in such partition.

Figure 2:
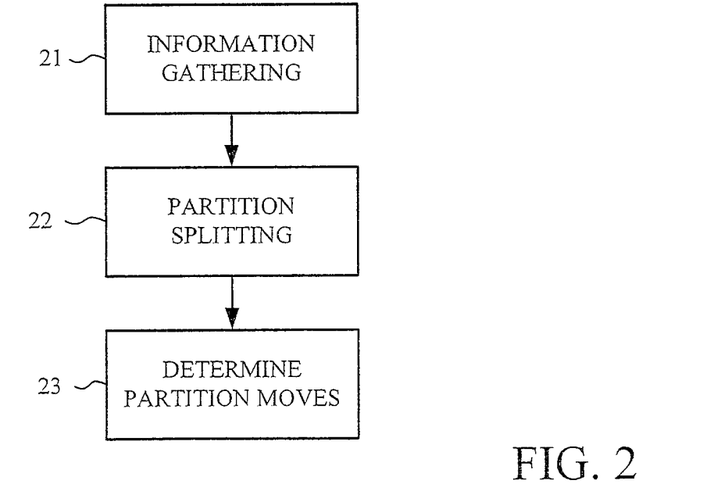
FIG. 2 is a flow diagram of a planning stage for a bulk load process.

In one embodiment, and with reference to FIG. 2, in planning stage 11, one phase 21 may involve the gathering of information by a bulk load server and/or staging servers on the new and existing records. This information may include key distribution information. Of course, more accurate and complete information on the key distributions of the existing and new records may be gathered by complete analysis of all of the existing and new records. In one embodiment, however, sampling of existing and new records during information gathering phase 21 may provide a sufficiently-accurate indication of record key distributions for dividing partitions and planning partition moves.

Information gathered in the information gathering phase 21 may allow the determination of the distribution of existing and new records across key ranges of partitions of a database. Thus, partitions may be analyzed in advance of any record insertions to determine how they should be split, and how new partitions should be created in order to prepare for the insertion of new records. Other information that may be relevant to planning for the bulk addition of records to a database may include a current set of partition boundaries, current assignments of partitions to servers, and minimum and/or maximum numbers of records desired per partition.

The information gathered at block 21 may be used to determine the partition splits that are to be made. Such dividing of partitions may result, for example, if a total number of existing and new records falling into a key range of a partition as determined in the information gathering stage 21 would exceed a limit for the maximum number of records for a partition. In such case, in a partition split, some existing records may be kept in an existing partition, and other existing records may be transferred to another partition or partitions. This may be done so that resultant split partitions have sufficient capacity to receive new records without exceeding, for example, a maximum partition size limit of a database.

Hypothetically, a database design may provide for each partition to hold a maximum of 10,000 records. Such a database design may also dictate that partitions maintain a minimum fill level, such as a minimum of 5,000 records, for example. Once partition splits have been determined, the partition splitting phase 22 may execute the partition splits by dividing the existing partitions as needed and/or desired.

After partition splitting phase 22, it may be desired to move partitions among storage servers. A partition move may involve movement of all existing records in a partition from one storage server to another. One phase 23 may determine how partitions may be selected to be reallocated among the storage servers.

This may be undertaken, for example, to reduce an amount of time to complete insertion of new records into the database. For example, partitions on one storage server may be assigned to receive a disproportionately large number of new records, and partitions on another storage server may only be assigned to receive a few records. It may thus be desired to move one or more partitions from the first of these storage servers to others of these storage servers to spread a record insertion load between and/or among them. The balancing of the insertion load among storage servers may involve an increased load on storage servers involved in the moving of partitions between and/or among them. This load may be taken into consideration in planning partition moves.

It may be desired to complete all planned partition moves for some or all of the storage servers prior to commencing insertion of new records into partitions stored on such storage servers. As mentioned above, this may reduce costs, such as time costs and resources costs involved if new records were inserted into a partition prior to the moving of a partition, and then moving the partition with its combination of old and new records to a different server.

In one embodiment, a new record insertion load may be quantified as an insertion cost. This insertion cost may be based, at least in part, on a number of records to be inserted into a partition. In a simple case, such number of records to be inserted into a partition may represent an insertion cost. When a partition is transferred from one storage server to another, the process involves transferring the existing records in the partition from one storage server to another. Thus, in like manner, a move cost associated with such transfer of a partition from one storage server to another may be based, at lest in part, on the number of existing records in a partition.

In one embodiment, it may be desired to reduce a total amount of time to complete all partition moves and record insertions associated with a bulk insertion of records. As partition moves may proceed in parallel across a network, the storage server that takes the most time to make all of its partition moves governs the total amount of time spent by the system making partition moves. Similarly, the storage server, operating in parallel with the other storage servers, that takes the most time to make all of its record insertions into the partitions it holds governs the total amount of time spent by the system in completing record insertions.

For example, under one plan for partition moves and record insertions, one storage server may be designated to receive a total of 50,000 new records to the partitions assigned to it. This may be the greatest number of new records assigned to be inserted into any storage server. Similarly, another storage server may be designated to have ten new partitions moved to it, and the total number of records contained in these partitions may be 30,000. This may be the greatest number of records any storage server is to receive as a result of partition moves. In a simple case, the one server may be assigned an insertion cost of 50,000, and the other server may be assigned a move cost of 30,000. A total cost for new record insertions and partition moves may be based on the sum of these two costs, i.e., 50,000+30,000=80,000.

In one embodiment, a goal may be to minimize such total cost represented by a sum of a maximum insertion cost and maximum move cost. It will be understood that a cost associated with the move of a partition may be incurred by both the storage server from which a partition is moved and by the storage server that receives the moved partition for storage.

Figure 3:
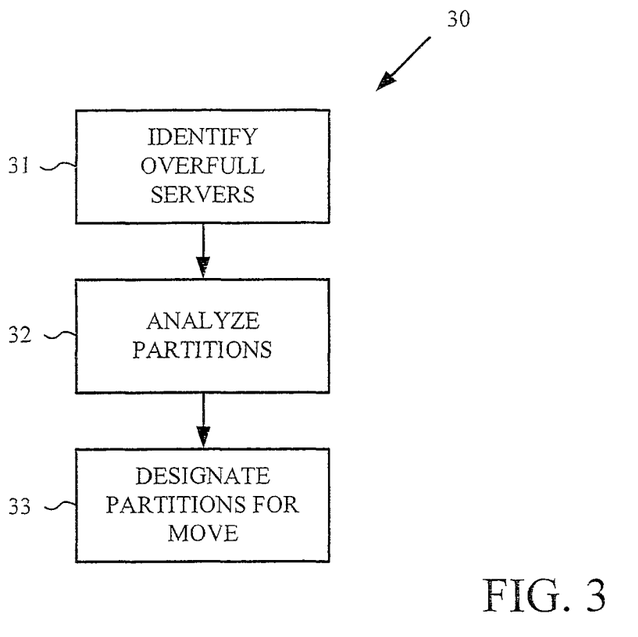
FIG. 3 is a flow diagram of an offload process.
Figure 4:
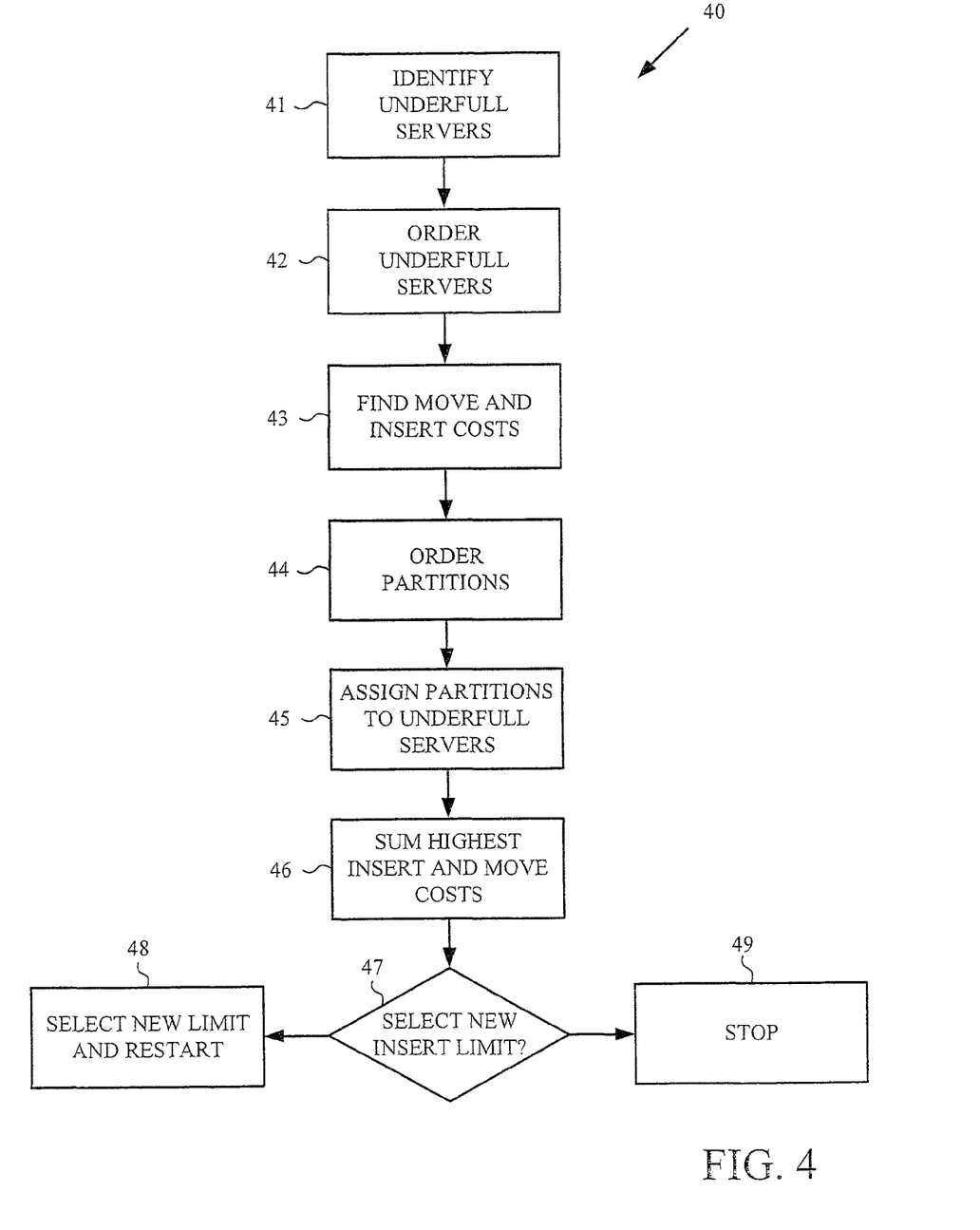
FIG. 4 is a flow diagram of an onload process.

According to this embodiment, partition moves may be planned based on the approach set forth in FIGS. 3 and 4. Referring to FIG. 3, in one embodiment an offload process 30 may be used to identify and select partitions for removal from storage servers. These partitions may be assigned to be moved to new storage servers based at least in part on the onload process 40 of FIG. 4.

While processes in this description, including the offload and onload processes 30, 40 illustrated in FIGS. 3 and 4 may be discussed and represented as sequences of processing phases, it should be understood that the phases in these processes are not necessarily required to execute in any particular order, and that claimed subject matter is not limited to a particular order of execution.

In the present embodiment, a transaction limit, and more particularly, an insert limit i may initially be chosen. This insert limit i may be used as an input to the offload process 30. A move limit μ may also be chosen at this time. Insert limit i may be a maximum permissible number of records that partitions on a storage server may be designated to receive. Similarly, move limit μ may be a maximum permissible number of existing records (records in existing partitions) that a storage server may be designated to transfer to another server or receive from another server. Transfer of a partition from one storage server to another, of course, may result in transfer of all existing records contained in the partition.

In one embodiment, an insert limit i may be chosen by a variety of different methods. It may be desired to select an insert limit i (or first insert limit i) at a level such that some storage servers may exceed the insert limit i and other storage servers may not. For example, an insert limit i may be chosen based at least in part on a function of the minimum and maximum numbers of records that storage servers may receive if no partition moves are made. That is, the greatest number of new records assigned to be inserted on any storage server may be used as a maximum. The fewest number of records assigned to be inserted on any storage server may be used as a minimum. These values may be based on the original assignments of partitions to the storage servers and on the actual or estimated number of new records that have keys falling within the key ranges of the partitions on each such storage server.

For example, partitions of one storage server may be currently assigned to have 10,000 record insertions made, and this may be the greatest number of record insertions assigned to the partitions of any storage server. Likewise, partitions currently residing on another storage server may have, in total, only have 5,000 records assigned to be inserted, and this may be a minimum for all storage servers. Thus, one method of choosing an insert limit i may be to take an average of these two values. This may be (10,000+5,000)/2, or 7,500. Other methods of choosing an insert limit i might include choices based on experience, or a function of the total number of new records to be inserted into a database divided by a number of partitions in the database, just to name a few examples.

A selected insert limit i may be used in the present embodiment in two processes that may identify partitions to be moved from one storage server to another. These processes may be an offload process 30 and an onload process 40. In one embodiment, and in general terms, an offload process may identify overfull storage servers, namely storage servers that would receive too many records (and thus have too high a total insertion cost).

In this regard, an insertion cost for a storage server may be based on the sum of insertion costs for each of the partitions stored on the storage server. An insertion cost of a partition may be based on the number of new records that may have been assigned for insertion into such partition. A move cost for a partition may be based on the total number of existing records in such partition.

Thus, for example, and in one embodiment, if there are ten partitions stored on a server, each of which has an insertion cost of 10,000, an insertion cost for the server would be 100,000. If an insert limit i of 90,000 has been chosen, then such storage server would be considered as overfull. One or more partitions may then be designated to be removed from such overfull server.

Selection of such partitions may be based, at least in part, on move costs and insertion costs of the partitions on an overfull server. It may be desired to designate one or more partitions for removal from an overfull server for which the move cost is relatively low as compared to the insertion cost. In one embodiment, partitions may be selected to be moved from an overfull storage server based, at least in part, on a ratio of a move cost to an insert cost.

Referring to FIG. 3, in one embodiment, the offload process 30 may determine which partitions are selected or designated to be moved from overfull storage servers to which they are currently assigned. The storage server to which each such partition may be moved may not have been identified at this time. Such partitions may be assigned to a conceptual common pool of partitions that will subsequently be assigned to different storage servers. Partitions alternatively may otherwise be tagged or identified as partitions to be removed from overfull storage servers. For example, a hypothetical common pool of partitions to be moved might be created on a bulk load controller as a list in which the current storage server hosting the partition is identified.

In one embodiment, an offload process 30 may proceed as follows. In block 31, storage servers that would receive excessive numbers of records may be identified using the insert limit i. This may be accomplished for each storage server by summing a number of records to be inserted (or estimated to be inserted) into each partition on such storage server. The sum may then be compared to the insert limit i, and storage servers with sums exceeding the insert limit i may be designated as overfull.

While partitions might be randomly selected for moving from an overfull storage server, in one embodiment, in the next block 32 the partitions on the overfull storage server may be further analyzed to permit selection of the partitions to be moved to another storage server. In one embodiment, a method of analyzing the partitions may comprise calculation of a ratio of a move cost to an insertion cost for each partition on an overfull storage server. As mentioned above, a move cost for a partition may be based on the number of existing records in such partition. An insertion cost for a partition may be based on a number of new records (or the estimate of the number of new records) assigned to be added to such partition. Such ratios associated with partition on a storage server may be used to select partitions to be moved from such server.

In block 33, partitions may be sequentially designated for removal from a storage server until such storage server is no longer overfull. In one embodiment, a partition on a storage server may be designated to be moved starting with a partition having the lowest ratio of move cost to insertion cost. Designation of partitions for removal from a server may continue in order of increasing ratios. The process may continue until partitions on a storage server that are not designated for removal are assigned to receive a total quantity of new records that does not exceed the insert limit i. It should be understood that, at this stage, partitions may not have been removed from an overfull storage server, but may have merely been designated to be moved.

After completion of the offload process 30 for storage servers that have been designated as overfull, one or more partitions may have been designated to be removed from overfull storage servers, as discussed above. However, designated partitions may not have been assigned a destination server to which they may be moved. That is, the storage server to which such designated partitions may be moved may not have been identified at this stage.

Referring to FIG. 4, and in one embodiment, after an offload process 30 has been completed, at least for one or more storage servers, an onload process 40 may commence. In one embodiment, an onload process 40 may identify storage servers that may receive a partition or partitions that have been designated for removal from an overfull storage server or servers.

In one embodiment, the onload process 40 may identify underfull storage servers in block 41. As previously mentioned, each partition on a storage server may have an insertion cost and move cost. If the sum of the insertion costs of the partitions on a storage server is less than the insert limit i, such storage server may be considered as underfull. Partitions may be relatively more or less underfull based on the insert costs for partitions stored on such storage server.

In block 42, underfull servers may be sorted or otherwise ordered at least in part according to the amount by which they are underfull. Thus, in one embodiment, with an insert limit i of 120,000, an underfull storage server with an insertion cost of 90,000 might be ordered before a storage server with an insertion cost of 100,000, and so on. A most underfull storage server thus may be chosen as a storage server having a lowest sum of the insertion costs of each existing partition it holds.

In block 43, onload process 40 may analyze move costs and insertion costs of each partition that was designated to be moved from an overfull storage server. These selected partitions may have been assigned to a conceptual common pool or otherwise tagged or designated to be moved.

In block 44, and according to one embodiment, partitions designated to be moved during an offload process may be ordered or selected for moving based at least in part on a ratio of move cost to insertion cost for such partitions. Partitions with lower ratios of move cost to insertion cost may be ordered or selected for moving ahead of partitions with higher ratios of move cost to insertion cost. Although an actual move cost of a partition may be used in calculating a ratio of move cost to insertion cost, in one embodiment a constant value may be chosen as a move cost for use in calculating a ratio for all of the partitions designated to be moved. Such a constant may be a move limit or a value, such as a highest value of move costs for any of the partitions designated to be moved. Of course, if a constant is used for a move cost for all of the partitions, this results in the partitions being ordered for moving from overfull servers to underfull servers in the order of decreasing insertion cost.

As will be appreciated by those skilled in the art, reference to sorting or ordering of partitions or storage servers may not necessarily refer to physical sorting. It will be appreciated that there are many ways of ordering servers, partitions, and so forth that may be used. In the case of partitions designated to be moved from overfull servers, for example, a table might be created that includes an identifier of each partition and an associated ratio based on move cost and insertion cost for the partition. In the case of insert and/or move costs, a value or value representative of such cost or costs may be used. Sorting of a table, or merely sequential scanning of the table, may provide a form of ordering or means for accessing partitions in order of decreasing or increasing cost as desired.

In block 45, partitions designated for moving from overfull storage servers may be assigned to underfull servers. In one embodiment, underfull storage servers may have been ordered from most underfull to least underfull in block 42. The most underfull server may receive one or more partitions that have been designated to be moved. Such partitions may be selected to be moved to the underfull server according to an order of increasing ratios of move cost to insertion cost for such partitions. Such ratios may have been determined in block 44. Assignment of selected partitions to an underfull storage server may continue until no more partitions can be added to such storage server without the total insertion cost for that server exceeding insert limit i. In practice, partitions may be assigned to the underfull server until a total insertion cost for the server exceeds insert limit i, and then the last partition to be assigned to such storage server may either remain assigned to that server or be reassigned to a next most underfull storage server. This may continue until all partitions designated to be moved (e.g., the partitions assigned to a common pool) have been assigned to be moved to an underfull storage server.

If too low a value (or initial value) of an insert limit i has been chosen, there may be too many partitions designated to be moved and too little capacity among underfull storage servers to receive them. Thus, a valid solution to, or plan for, partition moves may not have been found. If, however, all partitions designated to be moved may be assigned for moving to an underfull storage server, then a solution associated with a present insert limit i may be considered to have been found.

In block 46, in one embodiment, the server subject to the highest insertion cost and the server subject to the highest move cost may be identified. The insertion cost and move cost of each of these servers may be summed or otherwise combined to yield a total cost of the solution. It should be noted that the storage server with the highest insertion cost may or may not be the storage server with the highest move costs.

At this stage, additional partition assignment solutions/plans may be determined by repeating the offload and onload processes 30, 40 using different values for insert limit i. Thus, in block 47, a decision may be made to choose a new insert limit i and repeat the offload and onload processes 30, 40 with this new limit in block 48.

In one embodiment, a number of such iterations may be made as desired and the total cost of each such solution may be compared to a previous solution or solutions to determine the one with the lowest total cost.

A variety of methods may be used to determine a new insert limit i. For example, referring to FIG. 5, an initial insert limit may be successively increased and/or reduced by a percentage or increment or according to a formula or the like. Maximum and minimum limits may be chosen as upper and lower limits for choosing a new insert limit i. In one embodiment, new insert limits i may be chosen between such maximum and minimum limits. Various methods may be used for choosing maximum and minimum limits. A maximum insert limit may be chosen as a highest insert cost associated with any server. A minimum insert limit may be chosen as a total of new records to be added to the database divided by a number of partitions comprising such database.

Figure 5:
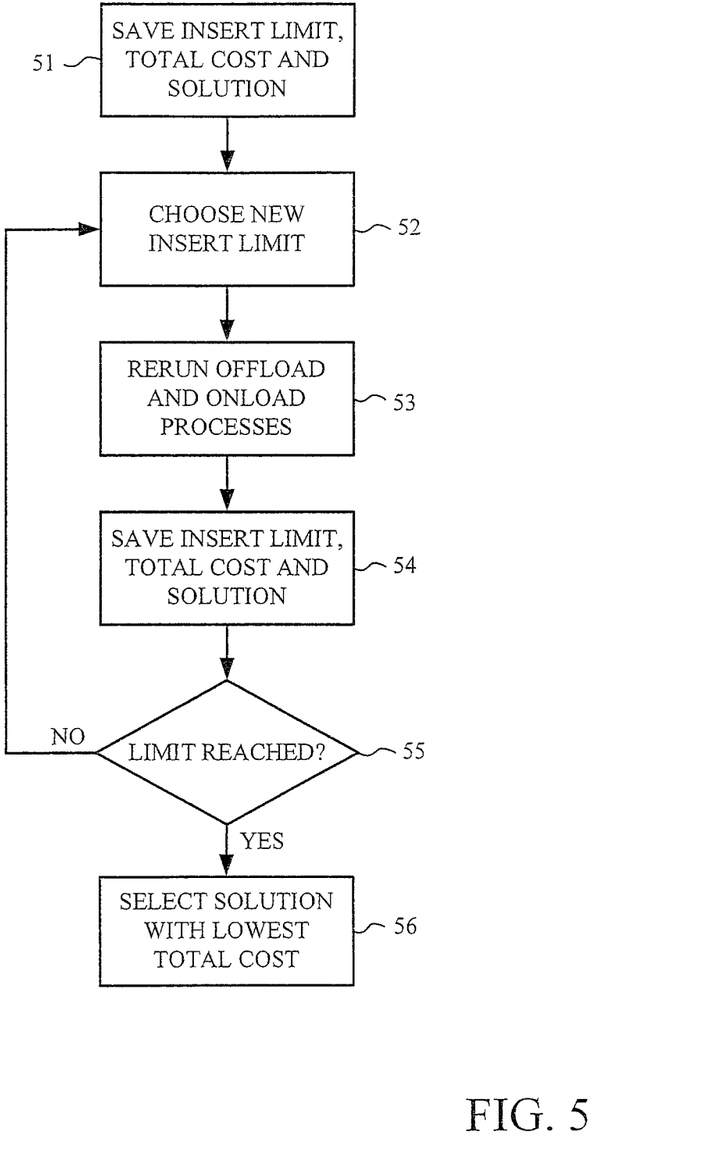
FIG. 5 is a flow diagram of a process for selecting multiple insert limits.

In one embodiment, in block 51, the initial insert limit i may be saved, together with the associated total cost found for the partition move solution and new partition assignments found during the offload 30 and onload 40 processes. A new insert limit i may be chosen in block 52. In one embodiment, a method for choosing such a new insert limit might be to decide to vary an initial insert limit by a percentage of an initial insert limit i. If an initial insert limit i was 100,000, a change factor of one percent of 100,000, or 1,000 might thus be chosen. This change factor might be used on one pass through blocks 52-54 to produce a new insert limit i by adding it to the original insert limit i.

On the next pass, this factor might be subtracted from an initial insert limit i to produce a new insert limit i that is less than an original insert limit i. Thus, if the original insert limit i is 100,000 and a change factor of 1,000 is chosen, successive passes through blocks 52-54 might sequentially use 101,000, 99,000, 102,000, 98,000, 103,000, 97,000 and so forth as values for an insert limit i.

In block 53, a newly-chosen insert limit may be used in rerunning offload and onload processes 30, 40. As seen above, this may result in a new set of partitions designated for moving from overfull storage servers to underfull storage servers (a new solution). A new total cost associated with this solution may also result from the rerunning of the offload and onload processes 30, 40.

In block 54, the new insert limit, total cost and solution for moving partitions from overfull to underfull servers may be saved.

A repeat limit may have been set for a maximum number of times a new insert limit i should be used in repeating the steps of blocks 52-54. In block 55, if a number of repetitions of passes executed for blocks 52-54 exceeds a repeat limit, then choosing of new insert limits i and rerunning of the offload and onload processes 30, 40 of blocks 52 and 53 may be terminated.

In block 56, total cost found for each saved solution for moving of partitions from overfull to underfull servers may be compared. A solution associated with a lowest total cost may be selected for implementation, as discussed below.

It will be appreciated by those skilled in the art that other methods of choosing new insert limits i in block 52 may be used. For example, in another embodiment, higher and lower insert limits i might be chosen according to a desired method, and a one of them that produces a solution with a lower total cost might be chosen. This insert limit might in turn be used to set new insert limits that are higher and lower than it, and a solution for these two insert limits with the lowest total cost might be used as a new insert limit. This process may be repeated through as many iterations as desired. Other methods of choosing new insert limits i will be apparent to those skilled in the art.

Since onload and offload procedures 30, 40 merely produce a solution or plan for moving partitions among servers, and do not involve actual transfer of partitions or records, a time cost for repeating blocks 52-55 with a new insert limit i, does not involve the dedication of as great an amount of computer resources as if partitions and all of their records were moved across the network.

While onload and offload processes 30, 40 have been discussed above with respect to a transaction limit such as an insert limit i, it will be appreciated that a move limit $\mu$ could be chosen as a transaction limit and the onload and offload procedures could be based on such a move limit $\mu$ instead of an insert limit i.

In one embodiment, once a solution has been chosen in block 56, a solution for partition moves has been selected. As explained above, this solution may designate one or more partitions to be removed from overfull storage servers, and may identify the underfull storage server to which each such partition may be moved.

Referring to FIG. 1, and in one embodiment, the stage 12 of execution of partition moves and new record insertions may commence. Overfull storage servers may be instructed, as by a bulk load controller, to transfer the partitions designated to be moved to the underfull storage server assigned to receive them according to the solution. This may be accomplished by transmitting partitions and any existing records they contain over a network. Staging servers storing the new records may then commence transmitting new records to storage servers over a network for insertion into partitions on storage servers. The staging servers may send new records to storage servers based on the key ranges of partitions on the storage servers. Storage servers receiving new records may then insert them into appropriate partitions according to the value of the keys of the new records.

The foregoing process may be adapted to large scale transactions other than the bulk loading of records into a database. For example, in the case of replication of databases, first and second server system may contain identical copies of a database. Bulk inserts of identical sets of new record could be made independently by both server systems using the methods described above. However, in one embodiment, if the partition structures and storage server assignments are identical for identical copies of a database, the solution selected in block 56 of FIG. 5 may be transmitted to a second, identical server system. This solution may then be implemented on storage servers of the other, identical server system causing them to make the same moves of partitions followed by insertion of new records.

Bulk updates of a database present another case for application of an analogous method to those described above. In a bulk update, records may be replaced or altered. For example, address information for individuals may change, and a database containing address information may require that a record be modified to reflect the new address. The amount of data in partitions of such database thus may not change over the course of the bulk update. It may be necessary in a bulk transaction such as a bulk update to move partitions to balance the update costs. In such case, an update cost may be used in a manner analogous to the insertion cost in determining partition moves. Determination of partition moves in a bulk transaction involving bulk deletion may be based on deletion costs rather than on insertion costs as in the methods described above.

Bulk insertions in the case of an index of a database may be desired if a bulk insertion of records is made into the database. However, an index may be sorted based on a key that is different from a key used for records in a database. For example, a value in a field in a record that is not a primary key of the database records might be used as a key for an index record. A key in an index record might also comprise a value of a field to which a key of the record is appended. As partitioning of index records may thus differ from partitioning of records in a database, in one embodiment, bulk insertion of index records into an index and partition move assignment may be handled as described for bulk insertion of records into a database.

Figure 6:
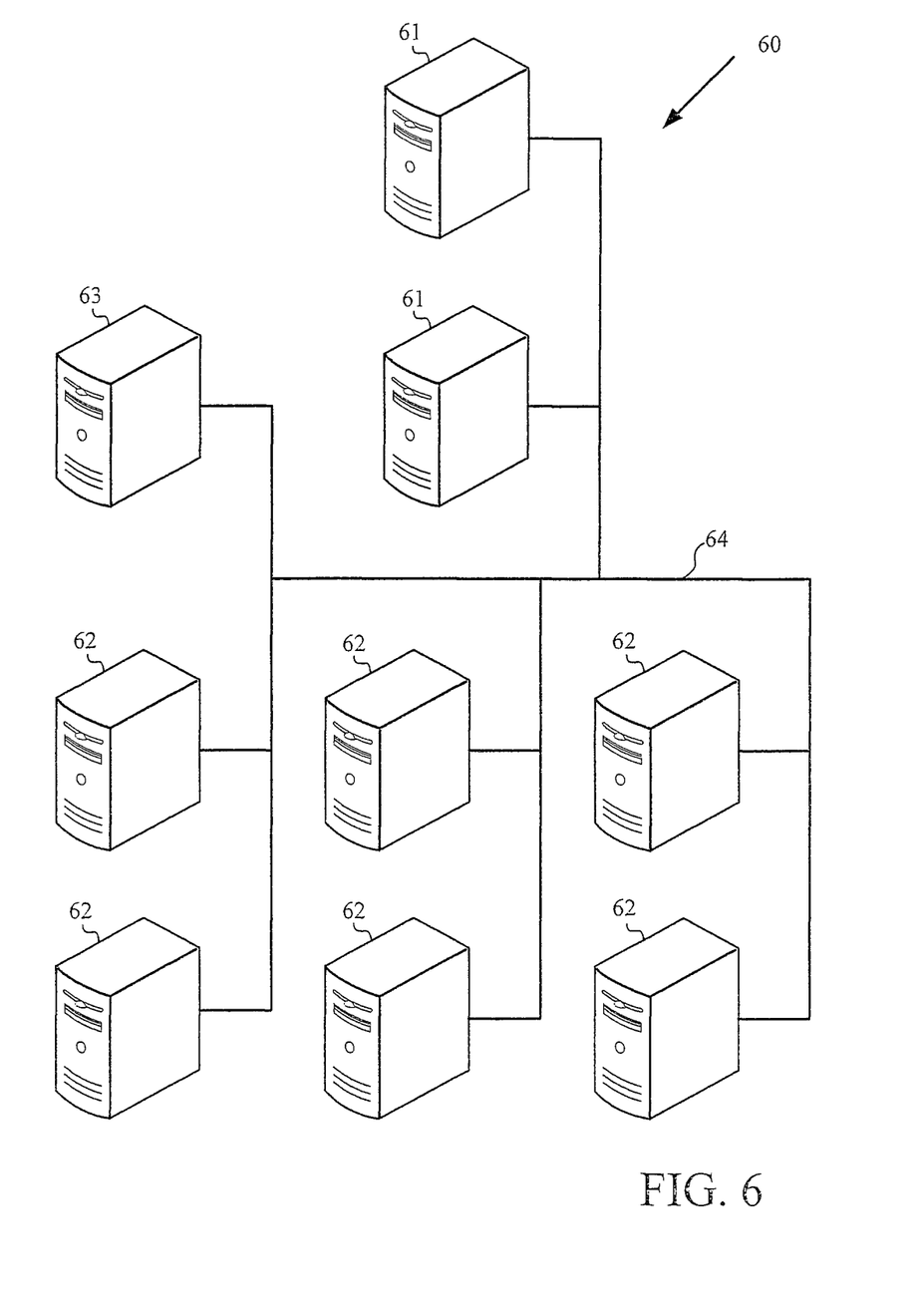
FIG. 6 is a schematic representation of a server system.

Referring to FIG. 6, one example of a server system on which the embodiments set forth above may be practiced may be server system 60. This server system may comprise a plurality of storage servers 61 on which the database partitions containing the database records may be stored. Each storage server 61 may contain a plurality of partitions. Although only six storage servers 61 are shown in FIG. 6, server system 60 may include a far greater number of such storage servers 61. Storage servers 61 may be in communication with one another via a communication network 64.

In addition to storage servers 61, the server system may include one or more staging servers 62. These staging servers 62 may receive new records to be inserted into the database. Use of a plurality of such staging servers 62 may allow for parallel processing of such tasks as inserting new records into partitions of a database and gathering statistical information on the new records. The staging servers 62 may be in communication with one another and with the storage servers 61 via a network 64.

A bulk load controller 63 may be in communication with storage servers 61 and staging servers 62. The bulk load controller may coordinate and execute some or all of the stages of the foregoing process, such as the information gathering of block 21 and the determination of partition moves of block 23 of FIG. 2.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:

identifying a plurality of partitions on a first storage server, wherein at least some partitions of the plurality of partitions includes a set of existing records;

identifying a set of new records to be inserted into at least one partition of the plurality of partitions;

in response to determining the first storage server is in an overfull state, said determining being based at least in part on the identified set of new records exceeding an insert limit, said insert limit being based at least in part on a maximum permissible number of records the plurality of partitions is capable to receive, determining an insertion cost for inserting a portion of said set of new records into respective partitions of the plurality of partitions, wherein said insertion cost is based, at least in part, on a number of new records within the portion of said set of new records to be inserted into the respective partitions of the plurality of partitions;

for each of the respective partitions of the plurality of partitions, determining a move cost based, at least in part, on a number of records in each of the respective partitions of the set of existing records;

selecting a first partition of the respective partitions of the plurality of partitions for transition to a second storage server based, at least in part, on a ratio of said move cost associated with the first partition of the respective partitions of the plurality of partitions to said insertion cost associated with the first partition of the respective partitions of the plurality of partitions; and transitioning the set of existing records of the selected first partition to the second storage server identified as an underfull storage server.

2. The method of claim 1, and further comprising:

determining whether said first storage server is in an overfull state based at least in part on an insert limit, wherein said insert limit is based at least in part on a maximum permissible number of records that said plurality of partitions is capable to receive.

3. The method of claim 1 further comprising determining a cost based at least in part on a sum of a maximum permissible number of new records that said second storage server is to receive, and a maximum permissible number of existing records that said first storage server is to transfer.

4. The method of claim 1 wherein said ratio is a first ratio, the method further comprising:

selecting a second partition of the respective partitions of the plurality of partitions for transition to the second storage server based, at least in part, on a second ratio, wherein said second ratio comprises a ratio of a move cost associated with the second partition of the respective partitions of the plurality of partitions to said insertion cost; and determining an order for transitioning the first partition of the respective partitions of the plurality of partitions relative to the second partition of the respective partitions of the plurality of partitions based at least in part on said first ratio and said second ratio.

5. An apparatus comprising:

a computing platform, the computing platform comprising at least one communications port for communicating with storage servers, the computing platform to:

identify a plurality of partitions on a first storage server, wherein at least some partitions of the plurality of partitions includes a set of existing records;

identify a set of new records to be inserted into at least one partition of the plurality of partitions;

in response to determining the first storage server is in an overfull state, said determining being based at least in part on the identified set of new records exceeding an insert limit, said insert limit being based at least in part on a maximum permissible number of records the plurality of partitions is capable to receive, determine an insertion cost for inserting a portion of said set of new records into respective partitions of the plurality of partitions, wherein said insertion cost is based, at least in part, on a number of new records within the portion of said set of new records to be inserted into the respective partitions of the plurality of partitions;

for each of the respective partitions of the plurality of partitions, determine a move cost based, at least in part, on a number of records in each of the respective partitions of the set of existing records;

select a first partition of the respective partitions of the plurality of partitions for transition to a second storage server based, at least in part, on a ratio of said move cost associated with the first partition of the respective partitions of the plurality of partitions to said insertion cost associated with the first partition of the respective partitions of the plurality of partitions; and transition the set of existing records of the selected first partition to the second storage server identified as an underfull storage server.

6. The apparatus of claim 5, the computing platform to further:

determine whether said first storage server is in an overfull state based at least in part on an insert limit, wherein said insert limit is based at least in part on a maximum permissible number of records that said plurality of partitions is capable to receive.

7. The apparatus of claim 5 wherein said ratio is a first ratio, the computing platform to further:

select a second partition of the respective partitions of the plurality of partitions for transition to the second storage server based, at least in part, on a second ratio, wherein said second ratio comprises a ratio of a move cost associated with the second partition of the respective partitions of the plurality of partitions to said insertion cost; and determine an order for transitioning the first partition of the respective partitions of the plurality of partitions relative to the second partition of the respective partitions of the plurality of partitions based at least in part on said first ratio and said second ratio.

8. An article comprising:

a non-transitory storage medium comprising machine readable instructions stored thereon executable by a computing platform to:

identify a plurality of partitions on a first storage server, wherein at least some partitions of the plurality of partitions includes a set of existing records;

identify a set of new records to be inserted into at least one partition of the plurality of partitions;

in response to determining the first storage server is in an overfull state, said determining being based at least in part on the identified set of new records exceeding an insert limit, said insert limit being based at least in part on a maximum permissible number of records the plurality of partitions is capable to receive, determine an insertion cost for inserting a portion of said set of new records into respective partitions of the plurality of partitions, wherein said insertion cost is based, at least in part, on a number of new records within the portion of said set of new records to be inserted into the respective partitions of the plurality of partitions;

for each of the respective partitions of the plurality of partitions, determine a move cost based, at least in part, on a number of records in each of the respective partitions of the set of existing records;

select a first partition of the respective partitions of the plurality of partitions for transition to a second storage server based, at least in part, on a ratio of said move cost associated with the first partition of the respective partitions of the plurality of partitions to said insertion cost associated with the first partition of the respective partitions of the plurality of partitions; and transition the set of existing records of the selected first partition to the second storage server identified as an underfull storage server.

9. The article of claim 8, said machine readable instructions being further executable by said computing platform to:

determine whether said first storage server is in an overfull state based at least in part on an insert limit, wherein said insert limit is based at least in part on a maximum permissible number of records that said plurality of partitions is capable to receive.

10. The article of claim 8, said machine readable instructions being further executable by said computing platform to:

determine a cost based at least in part on a sum of a maximum permissible number of new records that said second storage server is to receive, and a maximum permissible number of existing records that said first storage server is to transfer.

11. The article of claim 8 wherein said ratio is a first ratio, said machine readable instructions being further executable by said computing platform to:

select a second partition of the respective partitions of the plurality of partitions for transition to the second storage server based, at least in part, on a second ratio, wherein said second ratio comprises a ratio of a move cost associated with the second partition of the respective partitions of the plurality of partitions to said insertion cost; and determine an order for transitioning the first partition of the respective partitions of the plurality of partitions relative to the second partition of the respective partitions of the plurality of partitions based at least in part on said first ratio and said second ratio.

\* \* \* \* \*